March 7, 1939.  W. L. LODGE  2,149,972
AUTOMATIC TOASTER AND METHOD OF CONTROLLING THE SAME
Filed Dec. 8, 1937   2 Sheets-Sheet 1
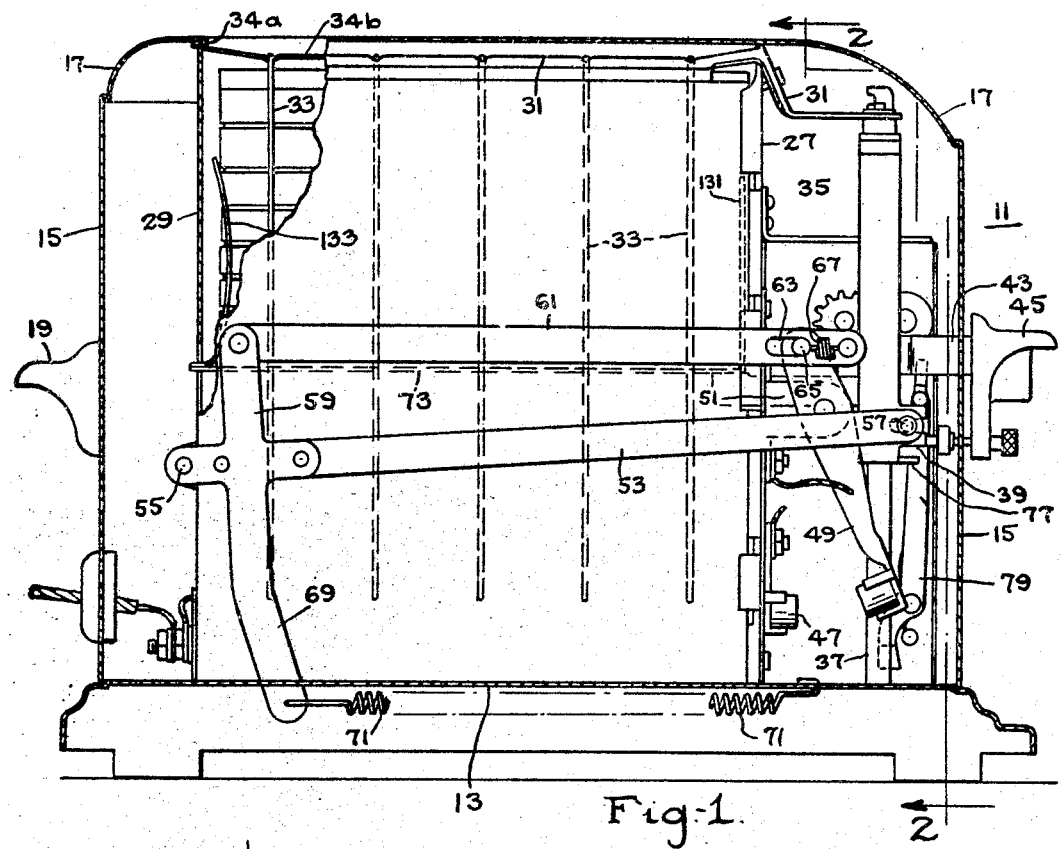
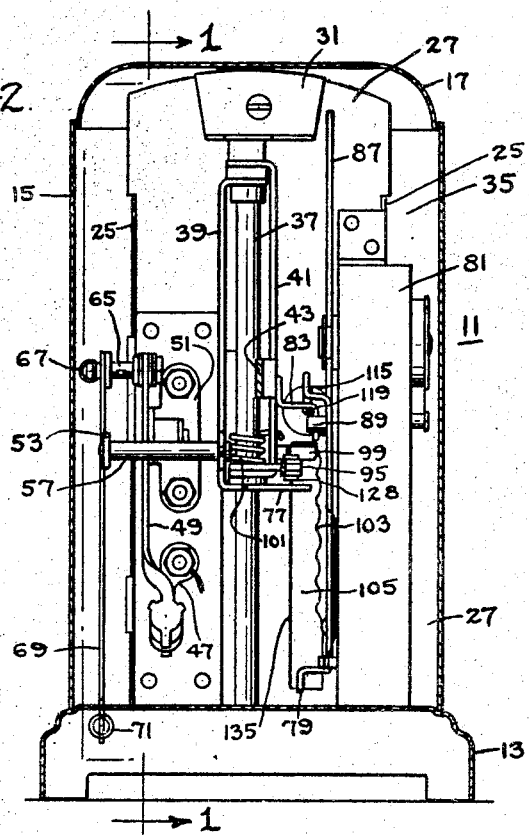
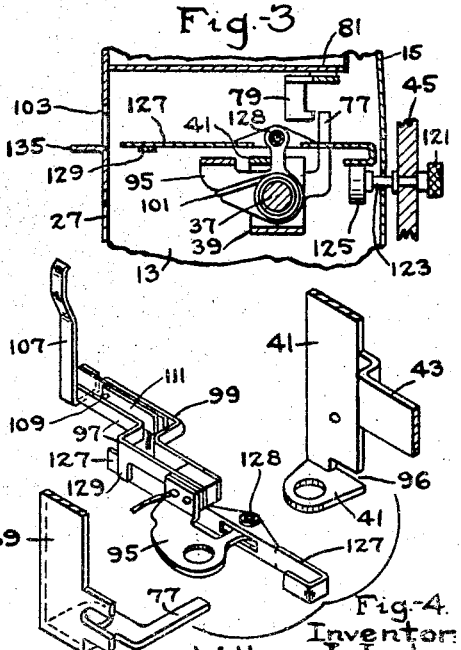
Inventor
William L. Lodge
By (signature)
Attorney.

March 7, 1939. W. L. LODGE 2,149,972
AUTOMATIC TOASTER AND METHOD OF CONTROLLING THE SAME
Filed Dec. 8, 1937 2 Sheets-Sheet 2
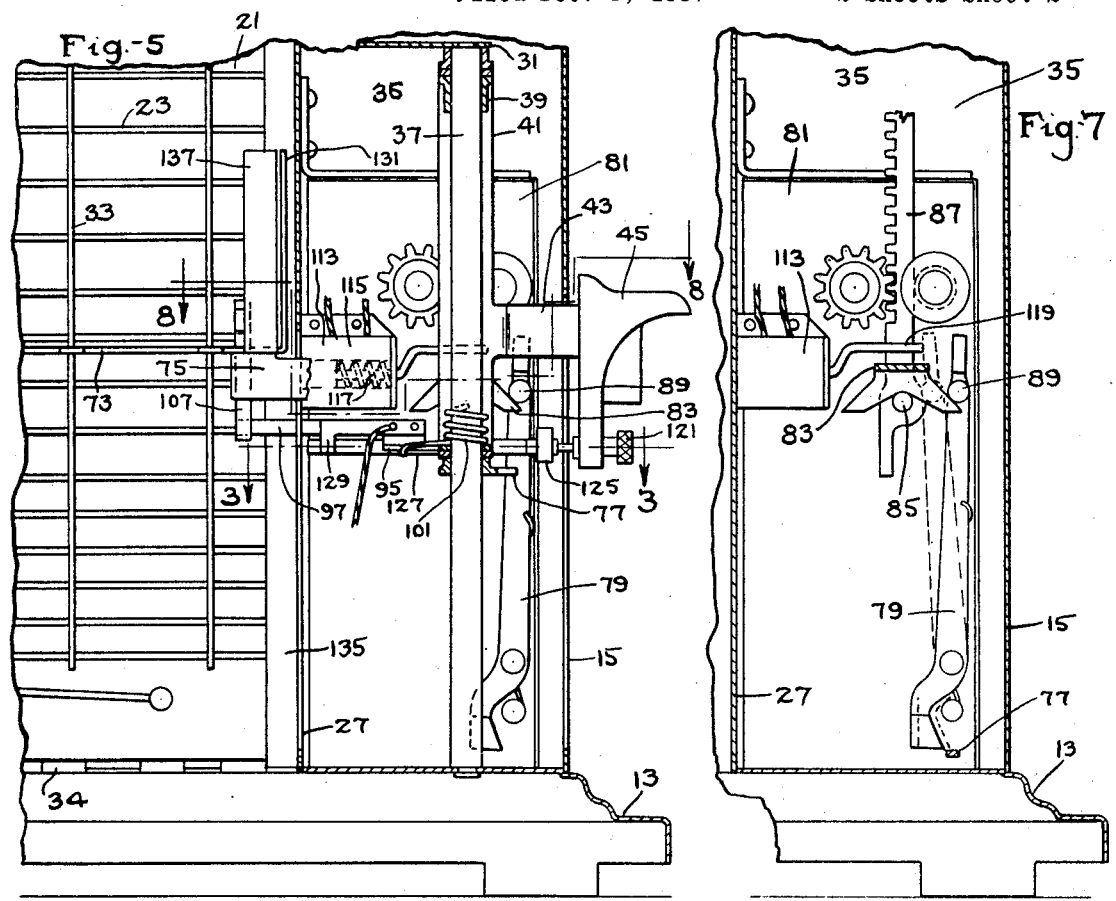
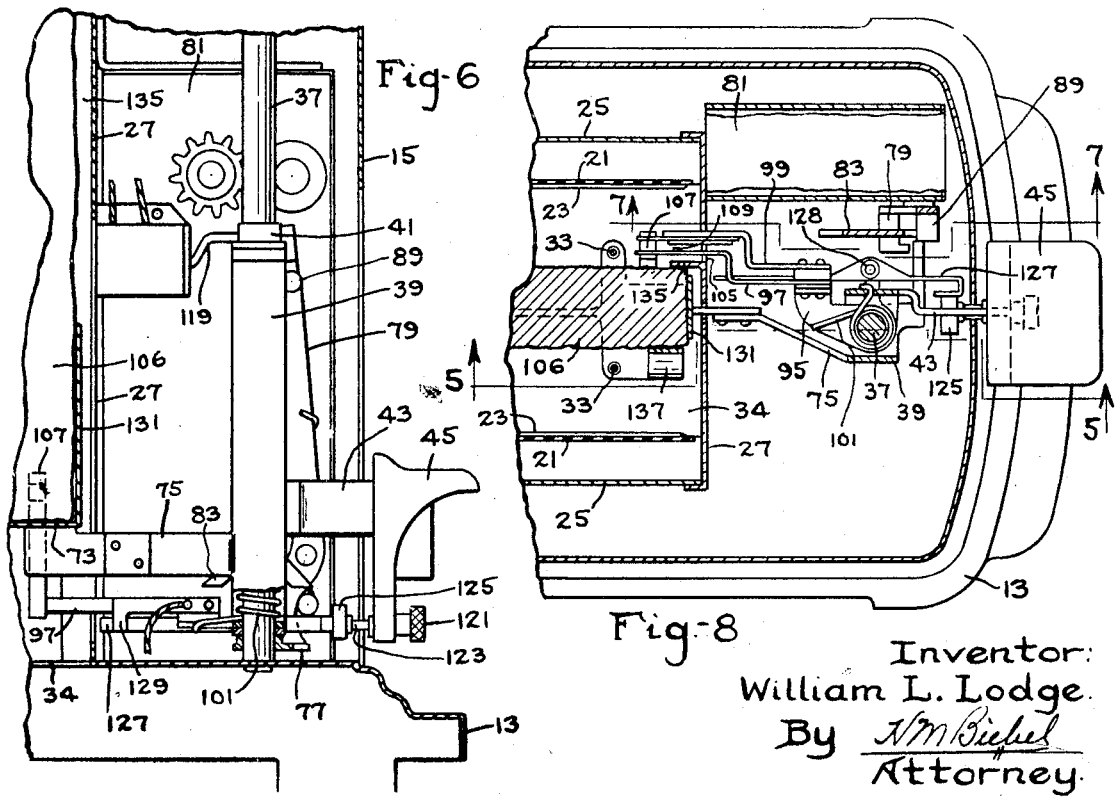
Inventor:
William L. Lodge.
By N. M. Biebel
Attorney Patented Mar. 7, 1939

2,149,972

UNITED STATES PATENT OFFICE 2,149,972

AUTOMATIC TOASTER AND METHOD OF CONTROLLING THE SAME

William L. Lodge, University, City, Mo., assignor to McGraw Electric Company, Chicago, Ill., a corporation of Delaware Application December 8, 1937, Serial No. 178,723

20 Claims. (Cl. 219—19)

My invention relates to toasters and particularly to toasting-operation control means for automatic electric toasters.

An object of my invention is to provide a relatively simple means of and method for determining the duration of an operating period of a toaster.

Another object of my invention is to provide a relatively simple timing means for a toaster that shall be operable in accordance with the degree of surface hardness of a toasting surface of a slice of bread being toasted.

Another object of my invention is to provide a relatively simple timing means for a toaster, that shall be independent of temperature variations of the toaster and that shall respond to a predetermined physical condition of a slice of bread being toasted. Other objects of my invention will either be apparent from a description of a device embodying my invention or will be pointed out in the course of such description and will be set forth in the appended claims.

I have found that the surface hardness of a toasting surface of a slice of bread being toasted is a measure of the degree of toasting which has been effected by heat from the heating means adjacent to the toasting surface. It is well known that the surface of an untoasted slice of bread has little or no hardness, but that on the contrary the surface of a toasted slice of bread is relatively hard and I have found that the increase of hardness is in substantially direct proportion to the degree of toasting. My invention relates in particular to novel means for repeatedly testing the surface hardness of successively different areas of a toasting surface of a slice of bread and for terminating the toasting operation when the hardness of the surface has reached a certain degree.

In the drawings,

Fig. 1 is a view in vertical longitudinal section through a toaster embodying my invention, taken on the line 1—1 of Fig. 2, shown on a slightly reduced scale, Fig. 2 is a view in vertical lateral section therethrough, taken on the line 2—2 of Fig. 1, also shown on a slightly reduced scale, Fig. 3 is a fragmentary horizontal sectional view taken on the line 3—3 of Fig. 5, Fig. 4 is a fragmentary exploded view, in perspective, of certain parts of the device, Fig. 5 is a fragmentary view in vertical section taken on the line 5—5 of Fig. 8 showing parts of the toaster in non-toasting position, Fig. 6 is a fragmentary view, similar to that of Fig. 5, but showing the parts of the toaster in toasting position, Fig. 7 is a fragmentary view in vertical longitudinal section, taken on the line 7—7 of Fig. 8, and, Fig. 8 is a fragmentary view in horizontal section taken on the line 8—8 of Fig. 5.

I have elected to show my improved control means as applied to a single slice toaster designated by the numeral 11, although I desire it to be understood that my invention is not limited to a single slice toaster nor is it limited to the particular details and elements shown in the drawings and described in the following specification.

The toaster 11 includes a metal base plate 13 which may be substantially rectangular in shape and of dished form as shown in Figs. 1 and 2 of the drawings.

An outer casing 15 includes front, rear, and side walls, the general shape of the casing being rectangular and having a top or cover 17 associated therewith. A carrying knob 19 may be secured to the rear wall of casing 15 to permit of carrying the toaster whenever desired.

A pair of vertically-extending heating elements includes, for each of the respective elements, sheets 21 of electric-insulating material, such as mica, on which is wound a suitable resistor element 23 and while I have shown the resistor 23 as being wound on one face only, I do not desire to be limited thereto. A pair of vertically-extending side baffle plates 25 are provided, as well as a front intermediate wall 27 and a rear intermediate wall 29. The heating elements cooperate with the front and the rear intermediate walls to define a toasting chamber, at least so far as its horizontal extent is concerned, while the top surface of the base 13 and the central portion of cover 17 cooperate to further define the toasting chamber. The upper edges of the heating elements are held in a well known manner by depending side flanges of top frame plates 31 and by top portions of guard wires 33 depending from the top frame plates all in a manner well known in the art. If desired an opening 34 may be provided in the base plate extending centrally and longitudinally thereof and between the two spaced heating units to permit of the passage of a current of air through the toaster. The cover and the top frame plate are provided with registering openings 34a and 34b to permit of the insertion and removal of slices of bread from the toasting chamber.

The front intermediate wall 27 cooperates with the front wall of the casing 15 and the forward portion of the cover 17 to constitute a mechanism chamber 35.

A vertically-extending standard 37 in the shape of a round rod has its lower end held by the base plate 13 while the upper end is held in proper operative position by the front end of the top frame plate 31. A slider 39 is vertically movable on standard 37 as is also a carriage 41. The carriage 41 is provided with a portion 43 extending through a vertical slot in the front wall of casing 15 and an actuating knob 45 is secured thereto.

The circuit of the heating elements is controlled by a fixed contact member 47 and a movable contact carried by arm 49 which is pivoted on bracket 51. Contact member 47 and bracket 51 are insulated from and mounted on front intermediate wall 27.

Contact arm 49 is actuated by slider 39 through a linkage comprising a lever 53, of T-shape, and a link 61. The rear end of lever 53 is pivoted at 55 on the rear intermediate wall 29. The forward end of lever 53 carries a cross pin 57, which cross pin extends laterally of the lever and moves in a slot in the lower end of slider 39. Arm 59 of the T-shaped lever is pivoted to the rear end of link 61, the front end of which is slotted to receive a pin 65 on the upper end of arm 49. A spring 67 which normally holds the pin in the right hand end of the slot permits a slight movement to insure good seating of the contacts. The lower arm 69 of the T-shaped lever extends through the base plate 13 and is drawn to the right by a coil spring 71, thus providing the tension which tends to lift slider 39 upwardly, and to disengage contacts 47 and 49.

A bread slice support 73 is vertically movable in the space between the two heating elements, its upper position being shown particularly in Fig. 5 of the drawings, this position being referred to hereinafter as the non-toasting position. The lowermost position is that shown in Fig. 6 of the drawings and will be hereinafter referred to as the toasting position. The bread slice support 73 is secured to slider 39 as by a connecting bar 75 shown particularly in Figs. 6 and 7 of the drawings. It is thus obvious that the bread slice support is moved from its initial or normal non-toasting position to its lower operative toasting position by downward movement of the knob 45.

Slider 39 is provided with a substantially horizontally extending latching lug 77 (see Fig. 2) which lug is adapted to move past and then below the lower end of a latch arm 79 which latch arm is pivotally mounted on a timing means 81 located in the mechanism chamber 35. It is thus evident that when an operator depresses knob 45, latching lug 77 will be moved under latch arm 79 and particularly the detent constituted by the lower end thereof so that the slider and the bread slice support will be held in their lower positions while at the same time contact 49 is in engagement with fixed contact member 47, thereby initiating a toasting operation.

The timer 81 which is provided to constitute a prime mover operable at substantially constant speed and having a spring as a driving means may be of the kind shown in Forbes Patent No. 1,665,735 and actuated means to effect termination of a toasting operation under emergency conditions. Carriage 41 is provided with a lateral extension 83 thereon, the lower edge of which is of inverted V-shape as shown more particularly in Fig. 7 of the drawings and a pin 85 on a rack bar 87 permits of winding up the timer 81 when knob 45 is depressed by an operator. Further details of a structure of this kind are shown in Ireland Patent No. 2,001,362.

As soon as knob 45 is released by the operator the timer spring will start to unwind and cause upward movement of rack bar 87 and of carriage 41 and it is to be noted that latch arm 79 is provided with a pin 89 at its upper end which may be engaged by an upper cam surface of portion 83 to cause releasing movement of the latch arm and of its lower end portion to thereby move the detent out of engagement with latching lug 77. As stated hereinbefore this is an emergency release so that should the control apparatus which is hereinafter described, fail for any reason to operate properly, termination of a toasting operation would still be effected.

A bracket plate 95 is mounted to slide on standard 37 and has interfitting engagement with a recess 96 in the lower end part of carriage 41 so that bracket 95 will move vertically upwardly and downwardly with carriage 41. The inner end of bracket 95 has insulatedly mounted thereon a resilient contact arm 97 and a second non-resilient arm 99 which latter is insulated from bracket 95 and from arm 97. A pair of rivets may be utilized to secure the two arms 97 and 99 on bracket 95. A spring 101 extending around standard 37 has one end interfitting with carriage 41 and the other end engaging bracket 95 so that the bracket 95 and the arms 97 and 99 tend to move in a clockwise direction as shown in Fig. 8 of the drawings. The outer surface of arm 99 is rounded as shown particularly in Figs. 2 and 4 of the drawings and is pressed by spring 101 into engagement with the serrated edge 103 of a slot 105 in the front wall 27 through which the arms 97 and 99 extend to the toasting chamber and at one side of a slice of bread 106 resting upon the bread slice support 73.

The inner end of arm 97 is provided with a substantially vertically-extending tactile member 107 having its lower end portion secured to arm 97 adjacent its inner end and having a lower hooked portion extending around arm 99 to limit the separating movement thereof. The upper end of member 107 is of substantially the shape shown in Fig. 4, that is of generally bowed-out shape having the ends thereof bent away from the intermediate portion in order to prevent tearing or gouging of the surface of bread.

It is obvious that since spring 101 tends to bias the bracket 95 and the arms 97 and 99 against the serrated edge 103 of slot 105 and since carriage 41 moves upwardly during the toasting operation, the two arms will be moved in a generally vertical sinuous path upwardly and the tactile member 107 is so designed and positioned that it will engage one toasting surface of a slice of bread being toasted. It will be noted that the sinuous movement and in particular the movement in a horizontal direction is caused by engagement of arm 99 with the serrated edge 103. The design and construction of the arms 97 and 99 and the spring 101 is such that, as long as the toasting surface of a slice of bread is soft, the tactile member 107 will be forced into the slice of bread, but that it will not be forced into the slice of bread when the surface hardness thereof has reached a certain value. When this occurs the inner end of arm 97 will tend to approach the inner end of arm 99 and this relative movement is made use of to close a latch release circuit.

Arm 97 has mounted thereon a contact member 109 while arm 99 has mounted thereon a contact member 111 which contact members are connected in an electric circuit at the same time as the heating elements are energized, which electric circuit includes a solenoid 113. A core 115 in the solenoid is pressed in one direction by a spring 117 (see Fig. 5) so that an extension 119 on the core or armature 115 will be normally out of engagement with latch arm 79. The design, insulation and construction of arms 97 and 99 and contacts 109 and 111 are such that the electric circuit including the solenoid 113 will be normally deenergized but will be energized when contacts 109 and 111 are in engagement. When engagement of contacts 109 and 111 occurs by reason of a lesser degree of movement of arm 97, than the movement of arm 99, because of the greater resistance to its bread-engaging movement when the toasting surface of the bread slice becomes harder, engagement of contacts 109 and 111 will occur, thereby energizing solenoid 113, causing outward movement of core 115 and extension 119 and engagement of the latter with latch arm 79. This causes release of the member 77 from latch arm 79, opening of the switch and raising of the bread slice support into non-toasting position by the hereinbefore mentioned action of coil spring 71.

Means for varying the degree of hardness at which engagement of contacts 109 and 111 will occur, thereby terminating the toasting operation, includes an adjusting knob 121 which may be rotatably mounted in the lower part of knob 45 and be secured to a suitable shaft 123 extending through the slot in the front part of casing 15. A cam 125 is secured to the inner end of shaft 123 and engages the outer end of a spring arm 127 insulatedly pivotally mounted on a part of bracket 95, as by a pivot pin 128, the inner end of arm 127 extending below arm 97 and engaging a depending portion 129 thereof so that more or less pressure may be applied to the intermediate portion of arm 97 to tend to move it into engagement with the slice of bread 106. Thus if cam 125 is turned so that the inner end of arm 127 applies a pressure to arm 97 tending to bias it toward a slice of bread the bread slice will be toasted to a greater degree before engagements of the two contacts 109 and 111 will occur.

It is desirable that the front edge of a slice of bread be in a definite position relative to the arms 97 and 99 and particularly with reference to the tactile member 107. In order to accomplish this the bread slice support 73 is provided at its front edge with a vertically extending stop 131 while the rear end of the bread slice support 73 is provided with a leaf spring 133 (see Fig. 1) whereby a slice of bread 106 will be forced into close engagement with stop 131. This fixes position of the bread longitudinally of the support.

In order to fix the position of the inner edge of a slice of bread laterally thereof front intermediate wall 27 may be provided with an inwardly extending projection 135 (see Fig. 8) while the bread slice support 73 may be provided at one side of its forward end with an upwardly extending leaf spring 137 effective to bias the bread slice 106 against flange 135, and to ensure that one toasting surface of successive bread slices shall be located in a predetermined position in the toaster irrespective of variations in the thickness of the different slices.

It is obvious, from the description thus far given of the structure associated with and operating the tactile member 107 that these elements are moved downwardly when knob 45 is actuated by an operator and that the bracket 95 and the spring arms 97 and 99 will be moved upwardly gradually at the same time as carriage 41 is moved upwardly and that the tactile member is moved into repetitive engagement with successively different portions of a toasting surface of a slice of bread which toasting surface is held in relatively fixed position in the toaster and particularly with relation to the tactile member. It is obvious that when the surface hardness of the toasting surface engaged by the tactile member has reached a certain value, arm 97 will be flexed slightly relatively to arm 99 causing engagement of contact members 109 and 111 and energization of the release circuit including solenoid 113. When this solenoid is energized extension 119 is moved away from the solenoid and into engagement with the upper end of latch arm 79 to effect release movement thereof of extension 77 from the detent end of latch arm 79 and the resultant quick upward movement of bread slice support 73 in the toasting chamber and simultaneous opening of the energizing circuit of the heater and of solenoid 113.

The device embodying my invention permits the use of an entirely new method of control of a toasting operation since it is dependent upon a selected physical condition of a toasting surface of a slice of bread, namely the surface hardness thereof. It is obvious that it will take a longer time to reach a desired degree of surface hardness when starting with a cold toaster than is the case when a toaster has been used for several immediately successive toasting operations. Since the hardness of a toasting surface of a slice of bread is the criterion used to determine the duration of a toasting operation, no compensating means whatever is required to correct for changes in the temperature of the toaster itself.

The device embodying my invention is relatively simple and easily operable and while I have shown a particular form of prime mover, my invention is not limited thereto since any other form of prime mover effective to cause a return movement of the carriage and attendant repetitive contacting movements on a toasting surface may be used by me, such as a small electric motor energized simultaneously with the heating elements of the toaster.

It is also obvious that contact members 109 and 111 may be normally in engagement and solenoid 113 normally energized with the armature and spring construction associated therewith changed so that disengagement of the contact members and consequent deenergization of the solenoid would effect release movement of member 119. In other words while I have shown a particular form of electro-magnetic release structure in which the coil is normally deenergized my invention is not limited thereto.

Various modifications may be made in the device embodying my invention without departing from the spirit and scope thereof, and I desire therefore that only such limitation shall be placed thereon as are imposed by the prior art or are set forth in the appended claims.

I claim as my invention:

1. In an automatic toaster, the combination with a heating means for toasting a slice of bread and means for initiating a toasting operation, of means for terminating a toasting operation operable in accordance with the surface hardness of a selected surface of a slice of bread being toasted and effective to terminate a toasting operation when the surface hardness of a selected surface of a slice of bread being toasted has increased to a certain value.

2. In an automatic toaster, the combination with a heating means for toasting a slice of bread and means for initiating a toasting operation of means for terminating a toasting operation including a member reciprocably actuable into and out of engagement with a toasting surface of a slice of bread and means controlled thereby for terminating a toasting operation when the hardness of a toasting surface of a piece of bread has increased to a given value.

3. In an automatic toaster, the combination with a heating means and means for moving a slice of bread into toasting position relatively to the heating means to initiate a toasting operation, of means to cause movement of the slice of bread out of toasting position including a tactile member movable into and out of engagement with a toasting surface of a slice of bread, power means connected to be energized simultaneously with the movement of the bread slice into toasting position for causing said movement of the tactile member and means controlled by said tactile member for causing movement of the toasted slice of bread out of said toasting position when the hardness of a toasting surface has increased to a given value.

4. In an automatic toaster, the combination with a heating means, a bread slice support movable relatively to the heating means into toasting and non-toasting position and biased to non-toasting position and a detent for holding the bread support in toasting position, of a tactile element actuable to engage with and disengage from successively different portions of a toasting surface of a slice of bread being toasted and means responsive to a predetermined movement of said tactile element to cause release of said detent when the hardness of a toasting surface of the bread being toasted has increased to a predetermined value.

5. In an automatic toaster, the combination with an electric heating means for toasting a slice of bread, a control switch for said heating means biased to open position and a detent for holding said switch in closed position, of an electromagnetic means for moving said detent to allow the control switch to open and means for controlling said electromagnetic means including means actuable in accordance with a predetermined increase in surface hardness of a toasting surface of a slice of bread being toasted.

6. In an automatic toaster, the combination with an electric heating means for toasting a slice of bread, a bread support movable into toasting and non-toasting positions relatively to said heating means and spring-biased to non-toasting position and a detent for holding said bread support in toasting position, of means for causing release of said detent after a time interval, said means including an electromagnetically-actuable detent release means, a control for said electromagnetic means actuable in accordance with increase in the surface hardness of a toasting surface of a slice of bread being toasted and operable to cause release of said detent when the surface hardness of said toasting surface has increased to a certain value.

7. In an automatic toaster, the combination with an electric heating means for toasting a slice of bread, a control switch therefor, a bread support movable into toasting and non-toasting position relatively to said heating means, a single spring for biasing the switch to open position and the bread support to non-toasting position, means for simultaneously moving the switch to closed position and the bread support to toasting position and a detent for holding said switch in closed position and said bread support in toasting position, of means for causing release of said detent after a toasting interval, said means including a normally deenergized electromagnetically-actuable release mechanism, an electric circuit therefor, a pair of cooperable contacts in said circuit normally in position to maintain said circuit in deenergized condition, a tactile member supporting one of said contacts, periodically movable into engagement with a toasting surface of a slice of bread being toasted and operable to cause circuit energizing movement of said contacts when said toasting surface has been hardened to a certain degree.

8. In an automatic toaster, the combination with an electric heating means for toasting a slice of bread, a control switch therefor, a bread support movable into toasting and non-toasting position relatively to said heating means, a single spring for biasing the switch to open position and the bread support to non-toasting position, means for simultaneously moving the switch to closed position and the bread support to toasting position and a detent for holding said switch in closed position and said bread support in toasting position, of means for causing release of said detent after a toasting interval, said means including an electromagnetically-actuable detent release means, a normally open circuit therefor and circuit closing means including normally disengaged contacts connected in said circuit and a tactile member periodically movable into engagement with a toasting surface of a slice of bread being toasted and adapted to cause engagement of said contacts when said toasting surface has been hardened to a certain degree.

9. In an automatic toaster, the combination with an electric heating means for toasting a slice of bread, a control switch therefor, a bread support movable into toasting and non-toasting position relatively to said heating means, a single spring for biasing the switch to open position and the bread support to non-toasting position, means for simultaneously moving the switch to closed position and the bread support to toasting position and said bread support in toasting position, of means for causing release of said detent after a toasting interval, said means including a normally deenergized electromagnetically-actuable release mechanism, an electric circuit therefor, a pair of cooperable contacts in said circuit normally in position to maintain said circuit in deenergized condition, a tactile member supporting one of said contacts, periodically movable into engagement with a toasting surface of a slice of bread being toasted and operable to cause circuit energizing movement of said contacts when said toasting surface has been hardened to a certain degree.

10. A toaster as set forth in claim 9 and including means for moving said tactile member along said toasting surface to cause it to engage successively different surface areas of the bread slice.

11. A toaster as set forth in claim 9 and including a mechanical timer having means for winding it by said switch closing and bread support moving means and effective to then cause movement of said tactile member along and adjacent to said toasting surface and into and out of engagement with said toasting surface.

12. A toaster as set forth in claim 9 and including means on said bread support for holding a slice of bread supported thereby in a fixed position thereon.

13. A toaster as set forth in claim 4 in which the tactile element is movable along said toasting surface to successively engage different areas of said toasting surface.

14. In an automatic toaster, the combination with a pair of spaced electric heating elements, a casing therearound, a front intermediate wall cooperating with the heating elements to define a toasting chamber and with a part of said casing to define a mechanism chamber, a bread slice support movable between the heating elements into toasting and non-toasting positions, a control switch for the heating elements, a spring for biasing the switch to open position and the bread support to non-toasting position, means for simultaneously closing the switch and moving the bread support to toasting position and a detent for holding the switch closed and the bread support in toasting position, of means for effecting a releasing movement of said detent when the surface hardness of a slice of bread being toasted has reached a certain value, said means including an arm supported at its outer end in said mechanism chamber and having its inner end extending into the toasting chamber through a slot in said front intermediate wall, a tactile member on the inner end of said arm adjacent a toasting surface of the bread, a second arm spaced from said first arm and having its inner end adjacent the inner end of the first arm, contacts on said arms normally out of engagement with each other, an electromagnetic detent release means including an electric circuit and said contacts and means for causing reciprocating movement of said arms to cause the tactile member to engage with and be disengaged from said toasting surface and to cause circuit closing engagement of said contacts when the surface hardness of a slive of bread being toasted has reached a certain value, to cause release of said detent.

15. A toaster as set forth in claim 7 in which said bread slice support includes means for definitely fixing the position of a toasting surface of a slice of bread in the support relatively to said tactile member.

16. A toaster as set forth in claim 7 in which the means causing movement of said tactile member includes a mechanical timer for causing said tactile member to move in a direction substantially parallel with a toasting surface of a slice of bread and a serrated edge wall of said slot in the front intermediate wall engaged by one of said arms.

17. A toaster as set forth in claim 14 and including a knob on the outside of said casing connected to vary the position of one of said arms relatively to the other arm to vary the degree of surface hardness at which said detent is released.

18. The method of determining the duration of a toasting operation on a slice of bread which comprises intermittent repetitive testing of the hardness of successively different portions of a toasting surface of a slice of bread being toasted by heat from a heating means during said operation and terminating said toasting operation when the surface hardness of the bread has increased to a given value.

19. The method of determining the duration of a toasting operation on a slice of bread which comprises intermittent repetitive testing of the hardness of a toasting surface of a slice of bread being toasted by heat from an energized heat source and deenergizing said heat source when the surface hardness of the bread has increased to a given value.

20. The method of determining the duration of a toasting operation on a slice of bread which comprises intermittent repetitive testing of the hardness of a toasting surface of a slice of bread being toasted by heat from a heat source and effecting a separating movement between the heat source and the slice of bread when the surface hardness of the bread has increased to a given value.

WILLIAM L. LODGE.